March 14, 1967  L. V. ERDLE  3,309,699
TRACKING SYSTEM FOR COMMUNICATION SATELLITES
Filed May 21, 1964  5 Sheets-Sheet 1

INVENTOR.
LOUIS V. ERDLE,
By Walter J. Adam
ATTORNEY.

March 14, 1967 L. V. ERDLE 3,309,699
TRACKING SYSTEM FOR COMMUNICATION SATELLITES
Filed May 21, 1964 5 Sheets-Sheet 2
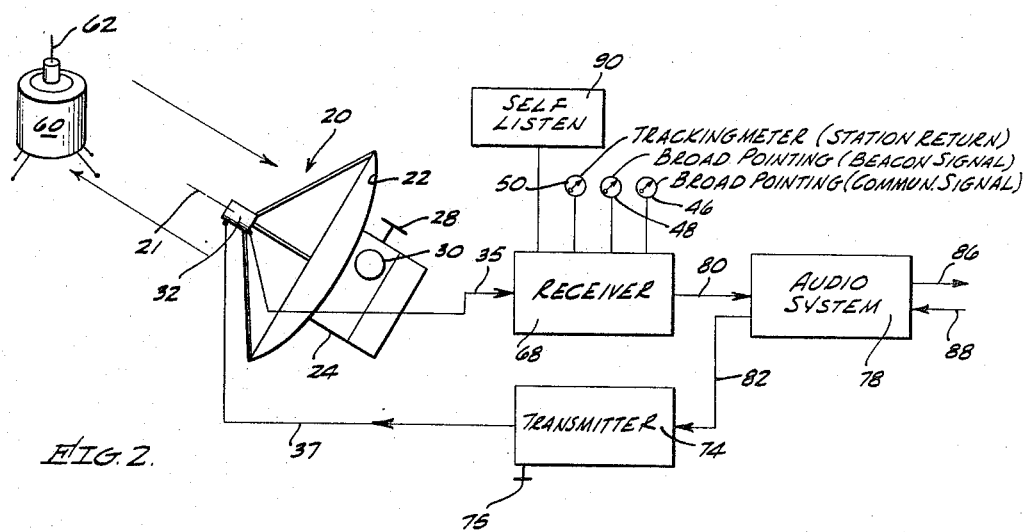
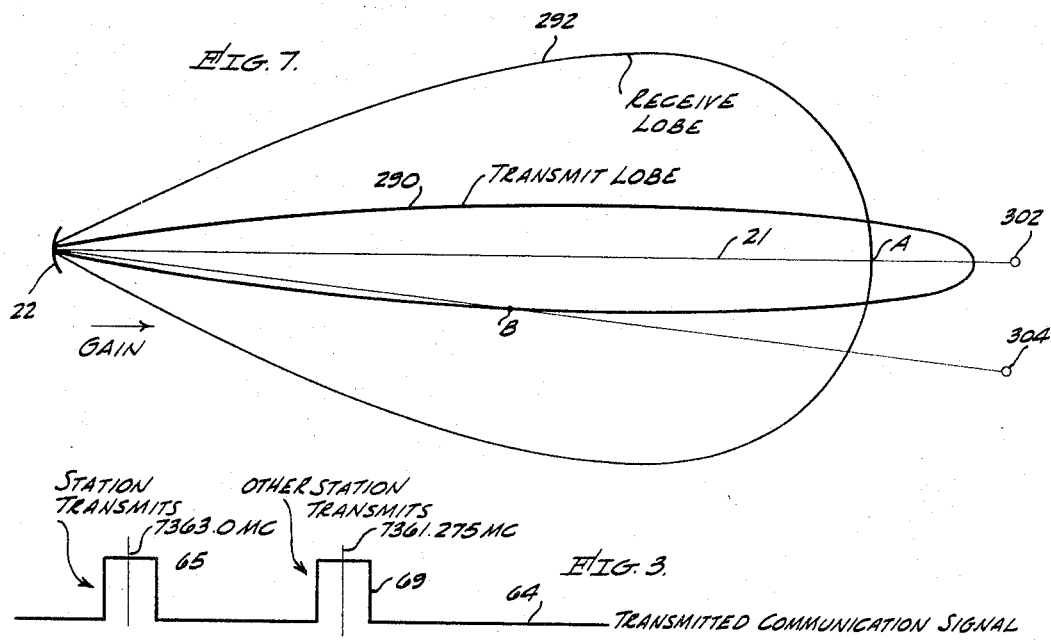
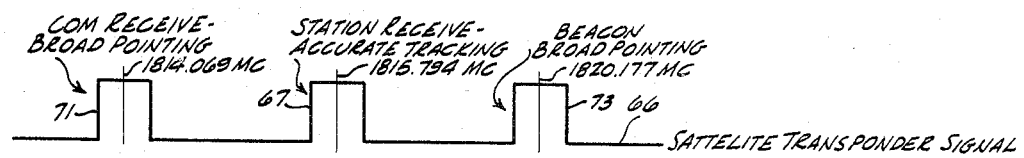

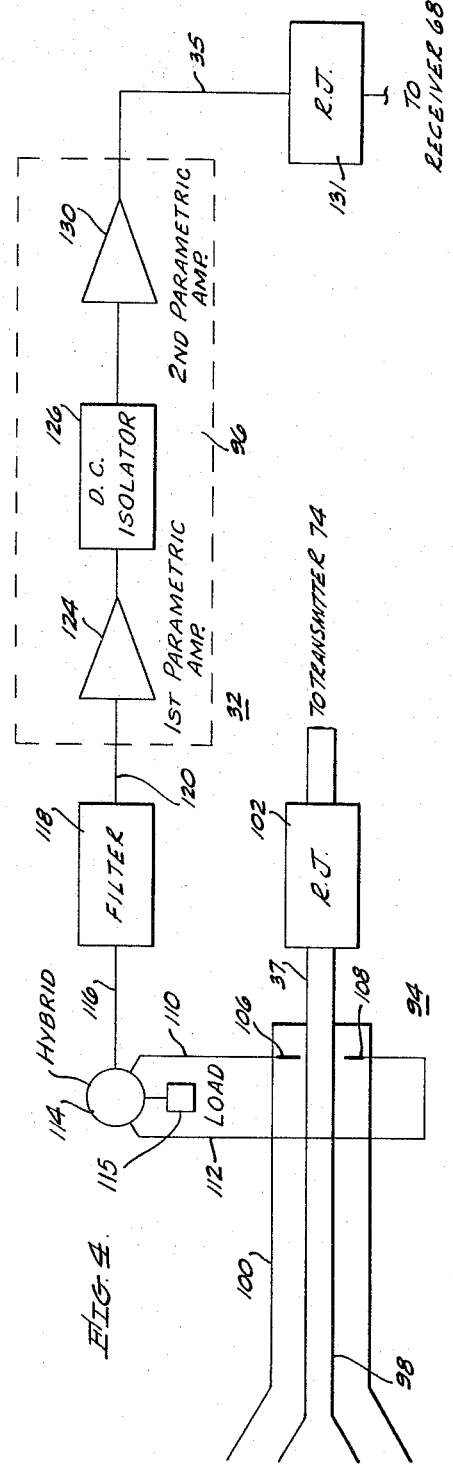
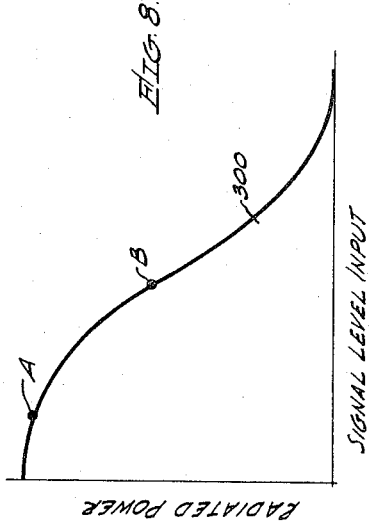

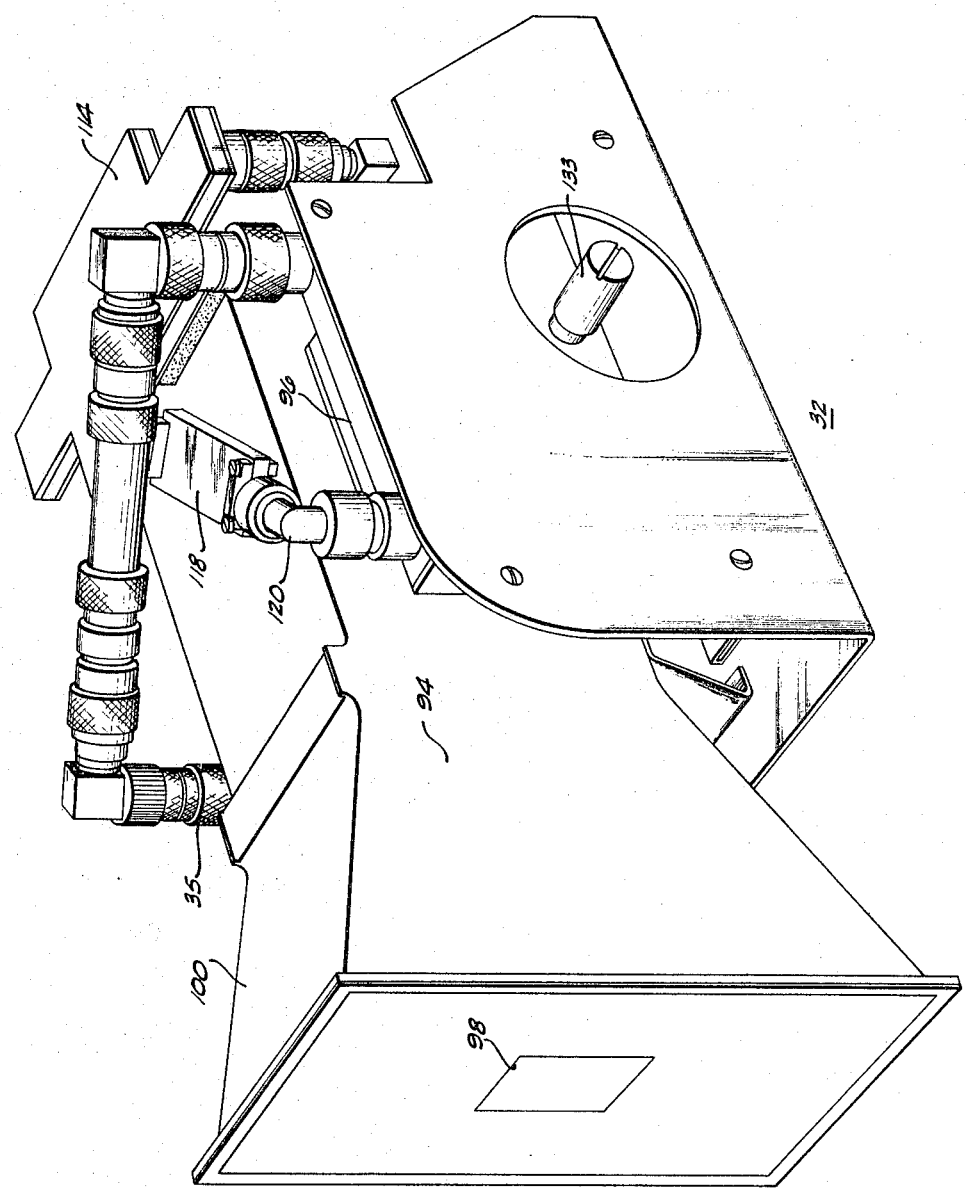

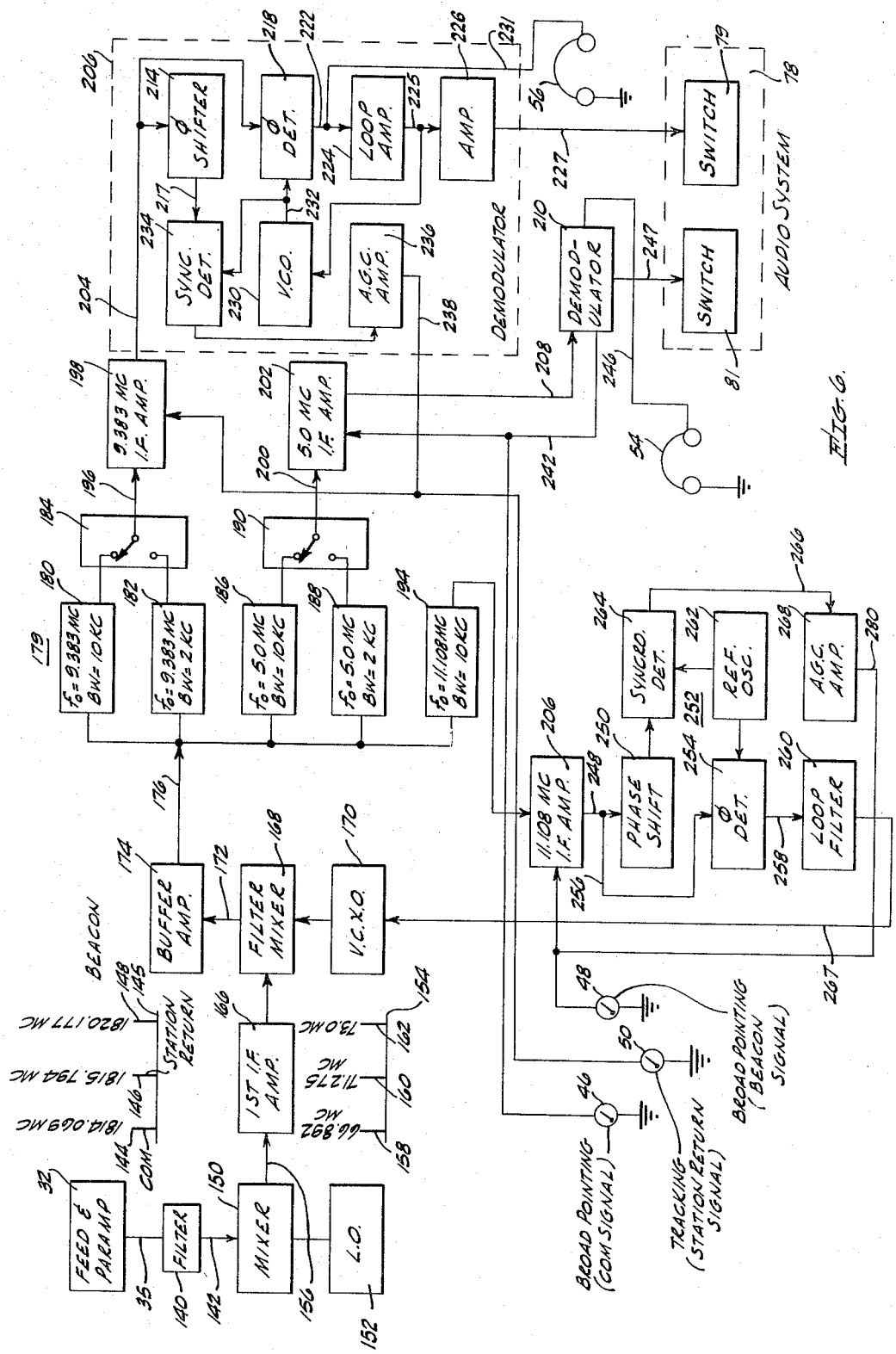

United States Patent Office 3,309,699
Patented Mar. 14, 1967

3,309,699
TRACKING SYSTEM FOR COMMUNICATION SATELLITES
Louis V. Erdle, Thousand Oaks, Calif., assignor to Hughes Aircraft Company, Culver City, Calif., a corporation of Delaware
Filed May 21, 1964, Ser. No. 369,070
16 Claims. (Cl. 343—6.5)

This invention relates to satellite tracking systems and particularly to a simplified and reliable communication system for providing reliable acquistion and tracking of a communication satellite.

Communication satellites may be of either the moving type which are continuously moving relative to the surface of the earth or of the synchronous type which are theoretically fixed in position relative to the earth but have been found to have continual movement because of the inaccuracies involved in placing the satellite in orbit, for example. Because of the substantially large distances between the earth and a satellite, a tracking system must be utilized to limit the power required by the ground communication stations and to maintain a constant signal level of the communication signals that are received and retransmitted by the satellite. Conventional satellite tracking stations utilize either separate transmit and receive antennas or a combined antenna to track a satellite in response to an error signal developed by either a monopulse or a conical scan arrangement. Tracking with these error signal arrangements has been found to result in a relatively large variation in the received signal level or a power loss because the error signals must be developed before a pointing correction may be performed. Also, a monopulse or conical scan tracking station must be accurately mounted and oriented with a rather specific knowledge of the position of the satellite in order to perform initial acquistion of the satellite for allowing the tracking operation to be performed.

For a movable ground tracking and communication system such as for use in the field by military units, the conventional stations are relatively complicated and heavy and require considerable time for installation prior to operation as well as a high degree of operator knowledge and skill. To develop a tracking station which is simple in construction and relatively easy to operate, a system must be utilized in which accurate and reliable tracking is provided without the complexities of a monopulse or conical scan type system. Also, it would be desirable for a tracking system that may be utilized in the field, that the system functions to provide general location or acquistion of the satellite prior to the accurate tracking operation without precise knowledge of the satellite position or accurate orientation of the tracking system structure.

It is therefore an object of this invention to provide a satellite communication station which is relatively simple in operation but allows accurate tracking of a satellite.

It is a still further object of this invention to provide a movable satellite tracking system that operates with a minimum of equipment.

It is another object of this invention to provide a simplified satellite communication station that maintains a relatively constant communication signal level that is comparable or more desirable than that obtainable with a monopulse or conical scan type system.

It is still another object of this invention to provide a satellite communication and tracking system that both develops a signal for broad pointing of the antenna to allow initial location or acquisition of the satellite and develops a signal for accurate pointing and tracking after location of the satellite.

Briefly, the satellite tracking system in accordance with the principles of the invention includes a communication system having an antenna, a receiver and a transmitter all of which may be mounted on a suitable movable structure. The system provides a signal to allow broad pointing of the antenna by interrogating either the received communication return signals conveyed from other stations through the satellite or the beacon signal developed by the satellite. Because the transponder in a satellite characteristically translates the signal to a relatively low frequency, the antenna lobe pattern is relatively wide for the received communication signal. The beacon signal is also conventionally developed at a relatively low frequency. After broad pointing is achieved accurate pointing or tracking is provided by interrogating the amplitude of the return signal of the station's own transmitted signal, which transmitted signal because of its relatively high frequency is included in a relatively narrow beam. The system thus utilizes the absolute knowledge contained in the transponder return signal that the antenna is pointing to provide maximum illumination of the satellite by the station's transmitted beam which is related to the amplitude of the return energy by a known function. Although the antenna direction may be changed by manual control, the system of the invention allows communication with a signal level variation over any period of time that is comparable or more desirable than with an error signal tracking system such as a monopulse or conical scan arrangement.

The novel features of this invention as well as the invention itself, both as to its organization and method of operation, will best be understood from the accompanying description, taken in connection with the accompanying drawings, in which like reference characters refer to like parts, and in which:

FIG. 2 is a schematic block and structural diagram of the satellite communication and tracking system of FIG. 1;

FIG. 3 is a schematic diagram of spectral signals for explaining the operation of the system of FIGS. 1 and 2;

FIG. 4 is a schematic diagram of the feed and parametric amplifier arrangement that may be utilized in the system of FIGS. 1 and 2;

FIG. 5 is a perspective diagram of the feed and parametric amplifier arrangement shown schematically in FIG. 4;

FIG. 6 is a block and circuit diagram of the receiver that may be utilized in the system of FIGS. 1 and 2;

FIG. 7 is a schematic diagram of antenna lobe or gain patterns for explaining the operation of the system of FIGS. 1 and 2; and FIG. 8 is a graph showing the satellite characteristics of radiated power versus signal level input power for further explaining the operation of the system of FIGS. 1 and 2.

Figure 1:
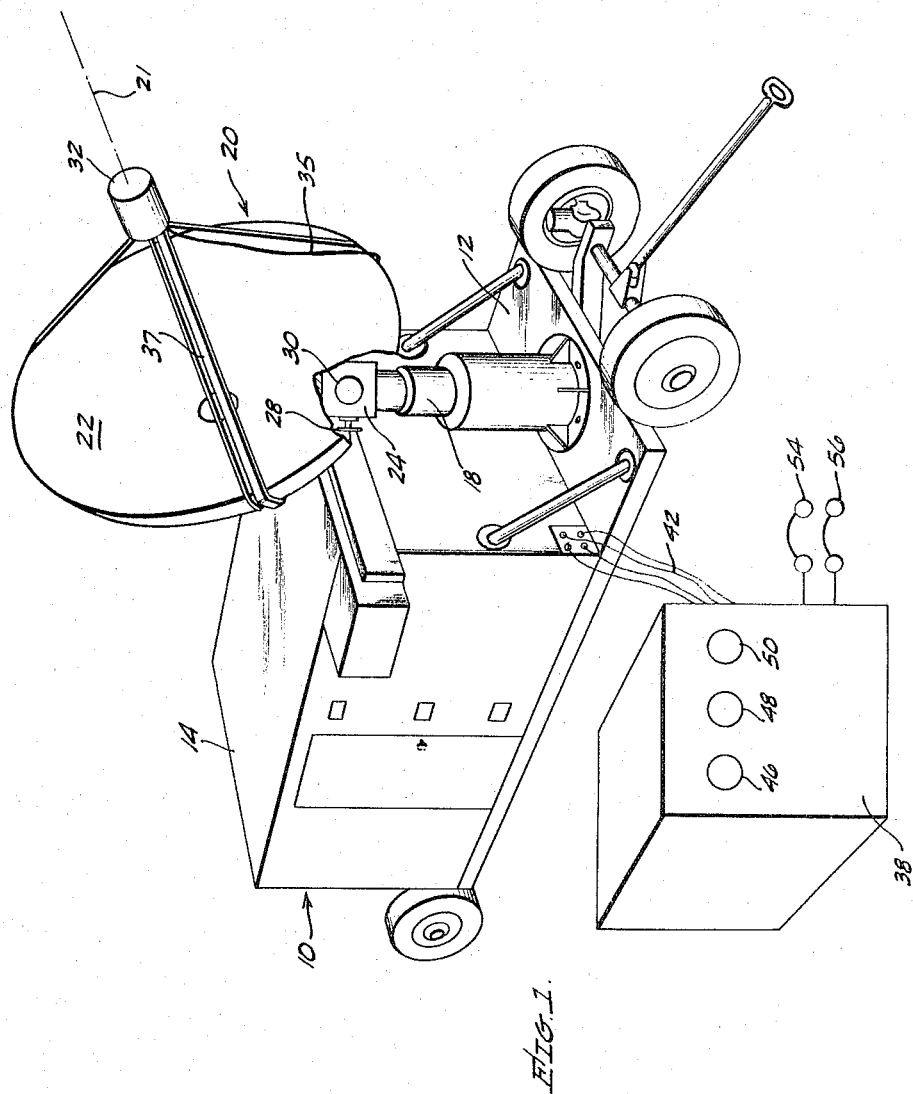
FIG. 1 is a perspective drawing showing the satellite communication and tracking system in accordance with the principles of the invention.

Referring first to FIG. 1, the satellite tracking and communication system in accordance with the invention may function as a field unit operable without requiring rigid mounting and orientation relative to the earth as is required with conventional tracking stations for initially locating or locking onto the satellite. The station of the invention may be moved to a new location and rapidly initiated into communication operation with only a general knowledge of the compass direction and the elevation angle of the satellite and with the use of a hand compass and an elevation angle measuring scale. The station includes a trailer 10 having suitable wheels and a frame 12 which may have a flat mounting surface. An equipment shelter 14 may be mounted on the frame 12 for enclosing the electronic equipment such as the transmitter, receiver, audio control systems, air conditioning and power supplies.

Mounted on the frame 12 is a telescoping riser structure 18 having an antenna 20 mounted on the top thereof. The antenna 20 includes a parabolic reflecting dish 22 which, for an illustrative example, may have a diameter of approximately 15 feet. The antenna 20 has a boresight or center axis 21 which during proper tracking or pointing is substantially coincident with a satellite in space. The dish 22 is connected through a gear structure 24 to the telescoping riser 18. For controlling the direction of pointing of the antenna 20, manual cranks or wheels 28 and 30 are provided at the gear structure 24 and may respectively vary the direction of pointing in two orthogonal planes. This type of gear structure for moving the direction of antenna pointing is well known in the art and will not be explained in detail. It is to be noted that in some arrangements in accordance with the invention, synchro motors may be included in the structure 24 for providing remote control of the antenna pointing direction. Mounted substantially at the apex of the parabolic dish 22 is a structure 32 including transmit and receive feed waveguides and a parametric amplifier. A coaxial cable 35 is coupled from the structure 32 into the telescoping riser 18 and the enclosure 14 for conducting received energy. Transmitted energy is passed through a waveguide 37 to the structure 32 after passing from the enclosure 14 and a rotary joint inside the telescoping riser 18.

In some arrangements in accordance with the invention, a panel structure 38 may be provided either as a separate unit mounted on a separate trailer (not shown), a separate unit set on the ground or a panel mounted on the enclosure 14 and a rotary joint inside the telescoping be coupled to the enclosure 14 through a plurality of cables or conductors 42, includes test meter dials, tracking and pointing meter dials and control switches. If the positions of the tracking control wheels 28 and 30 are remotely controlled, suitable manual control knobs (not shown) may be included on the panel 38. Meters 46, 48 and 50 are shown which indicate the receiver AGC (automatic gain control) voltages for respectively providing broad pointing in response to a communication signal received from other stations, broad pointing in response to the received satellite beacon signal and accurate pointing and tracking in response to the station's own transmitted signal after being returned by the transponder in the satellite. The operator may for initial antenna pointing during both a broad pointing operation or an accurate tracking operation, utilize ear phone sets 54 and 56 respectively for determining the amplitude of communication signals received from other stations through the satellite for broad pointing or for determining the amplitude of the station's own transmitted communication signal as returned by the satellite transponder for accurate tracking. It is to be noted that the human ear is unable to determine the peak amplitude of the demodulated voltages to a high degree of accuracy so the meters are observed after the ear phones have indicated that an apparent maximum power signal is received. Also for conditions in which a very high noise level is included with the communication signal, the ear phones are useful for discriminating the amplitude modulation of the demodulated communication signal.

Referring now to FIG. 2, the antenna 22 is shown pointing at a communication satellite 60 which, for example, may be synchronous or partly synchronous with the movement of the earth or may be a nonsynchronous or moving satellite. The satellite 60 may include a transmitting and receiving antenna 62, duel receivers, duel frequency translating systems and two travelling wave tube transmitters. The antenna 62 may include a receiving antenna positioned around a transmitting antenna. Because of a power saving for transmitting at lower microwave frequencies and signal to noise ratio requirements, the transponder provides, by a suitable heterodyning process, frequency translation or down conversion of the received carrier signals over a fixed or predetermined difference in frequency. The transponder includes a master oscillator, frequency multipliers and mixers to provide a constant shift in frequency of the input signal before transmitting. The system in accordance with the invention is operable with any communication satellite such as Syncom II, for example. Communication satellites are well known in the art and are described in Patent No. 3,028,488, "Satellite Communication Relay System Utilizing Modulation Conversion," by Thomas Hudspeth and Harold A. Rosen, in an article in Aviation Week of Aug. 20, 1962, pages 80 to 89, entitled, "First Syncom To Test Synchronous Orbit" by Barry Miller, and in "Vectors" magazine, volume V, Number 3, Third Quarter, 1963, published quarterly by Hughes Aircraft Company, at pages 1 through 9.

Although the principles of the invention are not to be limited to any particular frequencies, the antenna 20 may transmit, as may be seen in FIG. 3, FM (frequency modulation) communication signals to the satellite 60 in a spectral region 65 at a center frequency of 7363.0 mc. (megacycles) as shown by a spectral diagram 64 and the transponder may re-transmit the same information after frequency translation in a spectral region 67 at a center frequency of 1815.794 mc. as shown by a spectral diagram 66. At the same time, other stations on the earth may transmit communication signals in a spectral region 69 at a center frequency of 7361.275 mc. which is radiated by the satellite in a spectral region 71 at a frequency of 1814.069 mc. as shown by the spectral diagram 66. The system of the invention may utilize any intermediate frequencies of the diagram 64 with the transponder responding with the predetermined fixed down coversion of the carrier frequency. The beacon signal may be transmitted by the satellite in a spectral region 73 at a center frequency of 1820.177 mc. as shown in the spectral diagram 66. It is to be understood that although specific frequencies are shown for improved understanding of the system operation, the principles of this invention are not to be limited to any particular frequencies or range of frequencies.

An FM receiver 68 is coupled through the cable 35 from the parametric amplifier in the structure 32 and a transmitter 74 is coupled through a waveguide 37 directly to the feed in the structure 32. An audio system 78 is responsive to demodulated signals applied through a lead 80 from the receiver 68 and applies audio signals through a lead 82 to the transmitter 74 for transmission into space. Any conventional arrangement may be utilized for the transmitter 74 such as the frequency modulation transmitters shown on page 665 on the Radio Engineers' Handbook, by Frederick Terman, 1943, McGraw Hill Book Company, Inc., New York. The transmitter 74 may include a tuning arrangement for varying the frequency over a limited range as well known in the art indicated by a control knob 75 which may control the frequency of the primary oscillator utilized therein, for example. Communication between the station and other sources may be through any desired system such as telephone lines, teletype or local telephones (not shown) which are coupled to leads generally shown as leads 86 and 88. Informational signals which may be developed in the audio system 78 either by equipment therein or in response to signals received on the lead 88, are applied through the lead 82 to the transmitter 74 for transmission to the satellite 60. The audio system 78 may include amplifiers, switches, companders, echo suppressors and other communication elements as are well known in the art. The meters 46, 48 and 50 respectively indicate AGC voltage amplitudes developed by the received communication signal originating at other ground stations, the satellite beacon signal and the received communication signal after transmission by the subject station which is the station's own return signal. The meters 46 and 48 which are utilized for broad pointing or initial acquisition of the satellite are both desirable because a high power communication signal may decrease the beacon power radiated by the satellite, in which condition the communication signal amplitude is interrogated. In the absence of a communication signal, the beacon signal is necessary for the broad pointing operation. After broad pointing is performed by controlling the manual cranks 28 and 30, for example, the meter 50 is utilized to take advantage of the station's own narrow transmitted beam. A self listen unit 90 includes the ear phones 54 and 56 of FIG. 1 for an aid in pointing the antenna when listening to a communication signal from another station or the subject station's own return from the satellite 60.

Referring now to the schematic diagram of FIG. 4 and to the perspective drawing of FIG. 5, the feed structure 32 includes both a feed arrangement 94 and a parametric amplifier arrangement 96 integrated to form a compact unit. A transmit horn 98 is included within a receive horn 100 both having appropriate dimensions determined by the relatively high transmitting frequencies and the relatively low receive frequencies. The flare angles and the positions of the horns 98 and 100 are selected to provide proper focusing relative to the antenna dish 22. The transmit horn 98 is coupled through the waveguide 37 and a rotary joint 102 to the transmitter 74 (FIG. 2) for receiving energy therefrom. Energy intercepted by the receive horn 100 is sensed by probes 106 and 108 and applied through coaxial lines 110 and 112 to a 180 degree hybrid 114 for proper power division and phasing of the energy received by the two probes. Because two probes 106 and 108 are utilized, it has been found to be unnecessary to utilize a separating partition in the receive horn 100. The hybrid 114 develops a difference signal which is applied to a suitable impedance element or load 115 and develops a sum signal which is applied through a connecting coaxial connection 116 to a stripline filter 118 which provides a rejection band to the transmitted energy and a pass band to the received energy. The received energy is applied from the filter 118 through a coaxial connection 120 to a first parametric amplifier 124 of the two stage parametric amplifier 96. The parametric amplifier 124 is coupled through a D.C. isolating connection 126 to a second parametric amplifier 130. The parametric amplifier stages may be any conventional arrangements which suitable D.C. bias, as are well known in the art. The amplified information signal is applied from the parametric amplifier 130 through the coaxial line 35 and a rotary joint 131 to the receiver 68 (FIG. 2). As may be seen in FIG. 5, the parametric amplifier structure is positioned around the receive horn 100 so as to provide a compact unit and to eliminate losses from coaxial lines between the feed and the amplifier units. An adjusting knob 133 may be provided to control the tuning of the parametric amplifiers 96. It is to be noted that the principles of the invention are not to be limited to the particular feed and amplifier systems shown in FIGS. 4 and 5 but other feed and amplifier arrangements may be utilized in accordance with the principles of the invention.

Referring now to FIG. 6, the FM (frequency modulation) receiver will be explained in further detail in accordance with the principles of the invention. The feed and parametric amplifier structure 32 applies the amplified FM (frequency modulation) informational signal through the coaxial lead 35 to a band pass filter 140 of the receiver 68. The signal is then applied through the band pass filter 140 to a coaxial lead 142 as either a communication signal from other stations shown by a spectral line 144 of a spectral diagram 145, a return signal from the station's own intercepted communication signal shown by a spectral line 146, or a beacon signal shown by a spectral line 148. The center frequencies 1814.069 mc., 1815.794 mc. and 1820.177 mc. of the respective spectral lines 144, 146 and 148 may also be seen in the spectral diagram of FIG. 3. A mixer 150 responsive to a local oscillator 152 mixes or heterodynes the signals of the spectral diagram 145 to signals of a spectral diagram 154 on a coaxial line 156. As may be seen by the spectral diagram 154, the respective frequencies of the communication signal, the station's own return signal and the beacon signal may be centered at 66.892 mc., 71.275 mc. and 73.0 mc. shown by respective spectral lines 158, 160 and 162. A first IF (intermediate frequency) amplifier 166 responds to the signal on the line 156 to apply an amplified signal to a filter mixer unit 168 responsive to a voltage controlled crystal oscillator 170. After the second mixing operation, the informational signal may be applied through a lead 172 to a buffer amplifier 174 and in turn through a lead 176 to a narrow band filter arrangement 179. The station return signal is applied through narrow band filters 180 or 182 as determined by the position of a selection switch 184, the communication signal transmitted by other stations is applied through a narrow band filter 186 or 188 as controlled by a selection switch 190 and the intercepted beacon signal is applied through a filter 194. The station's own return signal is applied through the switch 184 to a lead 196 and to an IF amplifier 198 which may be centered at 9.383 mc. and the communication signal from other stations is applied from the switch 190 through a lead 200 to an IF amplifier 202 which may be centered at 5.0 mc. The beacon signal is applied from the filter 194 to an IF amplifier 206 which may be centered at 11.108 mc. The IF amplifiers 198, 202 and 206 are responsive to AGC (automatic gain control) voltages to maintain a substantially constant gain level, which type of amplifiers are well known in the art.

The amplitude controlled signal provided by the IF amplifier 198 is applied through a lead 204 to a phase lock FM demodulator circuit 206 and the amplitude controlled signal provided by the amplifier 202 is applied from a lead 208 to a similar FM demodulator circuit 210. The phase lock frequency modulation demodulator 206 includes a phase shifter 214 to apply the signal on the lead 204 after a selected phase shift which may be 90° to a lead 217. A phase detector 218 is coupled between the lead 204 and a lead 222 which in turn is coupled through a loop amplifier 224, a lead 225, a baseband amplifier 226 and a lead 227 to the audio system 78. The lead 222 is coupled through a lead 231 to the ear phones 56 for listening to the demodulator noise and the information of the station's own communication signal which is a function of the pointing direction of the antenna 20. A voltage controlled oscillator 230 is coupled between the lead 225 and a lead 232 which in turn is coupled to the phase detector 218. Also, a synchronous detector 234 is coupled between the lead 232 and the lead 217 at the phase shifter 214 for detecting the amplitude of the input IF signal. An AGC amplifier and integrator 236 is coupled between the synchronous detector 234 and an AGC lead 238 which in turn controls the gain of the IF amplifier 198.

The demodulator 210 which is similar to the demodulator 206 responds to an input signal on the lead 208 to develop an AGC voltage which is applied to an AGC lead 242 for controlling the gain of the IF amplifier 202. The voltage developed by the phase detector therein is applied through a lead 246 to the ear phones 54. Also, the demodulated signal after passing through a baseband amplifier is applied through a lead 247 to the audio system 78. The leads 227 and 247 may be coupled through switches 79 and 81 to the audio system 78 so that during normal operation with the frequency bands discussed relative to FIG. 3, only the communication signal on the lead 247 is received by the audio system. However, to provide flexibility to the system, the frequencies of the communication signal and the station's transmitting signal may be varied or interchanged within the principles of the invention.

The beacon signal is applied from the amplifier 206 through a lead 248 to a phase shifter 250 of a beacon demodulator loop 252. A phase detector 254 is coupled through a lead 256 to the lead 248 and through a lead 258 to a loop filter 260. A 5 mc. reference oscillator 262 applies a signal of a first frequency to the phase detector 254 as well as to a synchronous detector 264. In response to the signal shifted in phase 90 degrees by the phase shifter 250, the synchronous detector applies a signal through a lead 266 to an AGC amplifier and integrator 268 which in turn applies an amplified signal through an AGC lead 280 to control the gain of the IF amplifier 206. The loop filter 260 applies a control signal through a lead 267 to the voltage controlled crystal oscillator 170 so that the frequency of that oscillator is locked to that of the beacon signal.

The phase detectors 218 and 254 and the synchronous detectors 234 and 264 may be any conventional circuits such as shown on page 553 of the book, "Electronic Methods," volume 2, by E. Bleuler and R. O. Haxby, published by The Academic Press in New York. The phase shifters 214 and 250 may be any conventional arrangement such as shown on page 551 of the above-mentioned "Electronic Methods" book. The loop amplifiers and filters 224 and 260 may include a conventional RC filter having a first resistor coupled in the signal path and a second resistor coupled from a point in the signal path beyond the first resistor to a capacitor which in turn may be coupled to a source of reference potential. The loop amplifier may also include a conventional D.C. amplifier coupled to the output of the filter having a third resistor at the input and a feed back resistor coupled from a point between the third resistor and a gain element to the output terminal, which arrangements are well known in the art. Another circuit arrangement that may be utilized for the loop amplifiers 224 and 260 is shown on page 1949 of an article by W. L. Nelson entitled, "Phase-Lock Loop Design for Coherent Angle-Error Detection in the Telstar Satellite Tracking System," in the Bell Systems Technical Journal, Sept. 1963, Number 5, volume XLII. The AGC amplifier and integrators 236 and 268 may be similar to the loop amplifiers 224 and 260 except with an integrating capacitor provided at the output.

Because the AGC voltages developed by the demodulators are representative of the signal amplitude of the returned energy or the signal power intercepted by the antenna, the AGC voltage decreasing in amplitude when the communication signal increases in power, these signals provide an indication of the pointing direction of the antenna relative to the satellite. The meters 46, 48 and 50 are connected so that the value of the readings thereof increase as the AGC voltages decrease. The beacon signal meter 48 is couped to the AGC lead 280 and the communication signal meter 46 is coupled to the AGC lead 242 for providing broad pointing of the antenna when a maximum signal is indicated thereon which signal may be scaled in either voltage or decibels, for example. The tracking meter 50 is coupled to the AGC lead 238 for providing an indication of maximum return from the satellite being illuminated by the subject tracking station's own relatively narrow transmitting beam.

To further explain the operation of the receiver 68, the first IF mixing operation is performed by the mixer 150 in response to the local oscillator 152 which may include a conventional reference oscillator and several non-linear reactance diode multiplier elements. The second IF mixing is performed by the filter mixer 168 in response to the voltage controlled oscillator 170 locked in frequency to the beacon signal through the demodulator loop 252. After the second mixing operation, the IF signal is applied to the filter bank 179. For normal operation, the filters 180 and 186 may be utilized with the 10 kc. bandwidth for passing substantially all of the intercepted information signal. During conditions such as attenuation of the communication signal by weather conditions or signal jamming conditions, the filters 182 and 188 may be utilized which may reduce the information passed therethrough but also reduce the actual noise bandwidth. The 10 kc. bandwidth is maintained for beacon operation.

The station's own communication signal as returned from the satellite is applied through the amplifier 198 and to the phase detector 218. As is well known in the art, phase lock demodulators provide an output signal from the phase detector with an amplitude proportional to the input phase differences. Because phase difference is the integral of frequency difference, the transfer function of the phase detector to a frequency difference input is that of an integrator. The output signal of the voltage controlled oscillator 230 is a frequency difference proportional to the control voltage on the lead 225, so that its transfer function is a gain constant. In the demodulator utilized in the system of the invention in which the noise is limited by the IF filter, the loop bandwidth and the noise bandwidth of the phase lock loop itself are designed relatively wide so that high loop gain required for increased loop bandwidth makes the phase error due to input signal modulation relatively small, that is, the error voltage required to make the voltage controlled oscillator track the input carrier deviations. Over the range of frequency modulation indexes of practical interest the loop noise bandwidth resulting from a phase lock loop designed according to current phase error optimizing methods is greater than the IF bandwidth required to pass the signal spectrum to the demodulator. Thus in the system of FIG. 6, the demodulator is preceded by IF filters of substantially small bandwidth for passing the informational signal and limiting the noise to provide a relatively high threshold sensitivity. As is well known in the art, the total M.S. (mean square) phase error that causes threshold effects is the noise tracking phase error which is proportional to noise bandwidth and the carrier modulation phase error which is inversely proportional to the noise bandwidth. Because the noise power in the loop is limited by the IF filter, the loop is designed with a relatively large gain resulting in the loop bandwidth, the noise bandwidth of the loop itself and the undamped natural resonant frequency being relatively large compared to the upper limit of the band of noise passed through the IF filters such as 180 and 182 and demodulated in the loop. The loop bandwidth, the noise bandwidth and the undamped natural resonant frequency are substantially independent of noise band in the loop as a result of the effective IF filtering. The limited noise power allows a relatively large loop gain to be utilized without the noise causing threshold degradation. The demodulators 206 and 210 which have a relatively wide bandwidth in the phase locked loop are thus responsive to either the relatively narrow 10 kc. or 2 kc. filters of the filter bank 179 without varying the parameters of the loop components. It is to be understood that other FM demodulator arrangements as are well known in the art may be utilized in the receiver 68 in accordance with the principles of the invention.

The voltage developed by the phase detector 218 has a noise level representative of the power intercepted by the antenna 20 so that the signal over noise level in the ear phones 56 provides an indication of the accurate pointing direction. The phase detector 218 conventionally responds to phase variations from a phase condition on the lead 232 which is 90 degrees out of phase from the signal on the lead 204. Thus, the phase shifter 214 shifts the phases of the input signal to that on the lead 232 so that the synchronous detector 234 responds to the amplitude modulation of the input carrier signal. The synchronous detector 234 develops an average D.C. voltage which after passing through the AGC amplifier and integrator 236 is the AGC voltage to control the gain of the IF amplifier 198. The AGC voltage on the lead 238 which is a function of the amplitude of the intercepted signal, is applied to the meter 50 to indicate a maximum or peak value when the antenna 20 is pointing directly at the satellite, the power intercepted by the antenna system 20 being a function of the station's narrow transmitted beam. The demodulator 210 operates in a similar manner to apply an AGC voltage to the lead 242 and to the IF amplifier 202 and the meter 46 for broad pointing control.

The demodulator loop 252 maintains the voltage controlled oscillator 170 at a frequency that is a function of the beacon frequency so that the center frequencies of the communication signals have constant values at the filter bank 179. The phase detector 254 responds to the phase of the input signal and a reference signal of fixed frequency developed by the oscillator 262 to control the voltage controlled oscillator 170. The amplitude of the beacon signal is maintained constant by the voltage developed by the synchronous detector 264 by a comparison with the signal of the reference oscillator 262, and applied through the AGC amplifier and integrator 268 to the amplifier 206 as an AGC voltage. The amplitude of the AGC voltage signal is also displayed on the meter 48 for pointing the antenna so a maximum reading is developed when broad pointing is performed in response to the beacon signal.

For normal operation of the system at the frequencies described, the audio signal developed by the demodulator 206 representative of the station's own FM modulated transmitted signal, is not utilized by the audio system 78 and may be applied to an open switch 79. However, for system flexibility, if other stations transmit at the subject station's transmitting frequency such as 7363.0 mc. (FIG. 3) the audio signal may be applied through the switch 79 as the communication signal. In this condition, the switch 81 would be opened if the subject station transmitted at the frequency of 7361.275 mc., for example, and the accurate tracking would be performed by the meter 46 and the ear phones 54. Under these operating conditions, broad pointing or acquisition of the satellite would be performed by utilizing the meter 50 and the ear phones 56. It is to be noted that the communicated information after demodulation of the FM carrier to audio signals is applied to the ear phones 54 and 56.

The ear phones 54 and 56 allow listening to the relatively constant voice or information signal with the noise decreasing as the angular pointing error decreases. Because the gain controlled amplifiers 198 and 202 maintain the carrier at a substantially constant level (when the pointing direction is such that a carrier is being received) the gain of the gain controlled amplifiers decreases as the pointing error decreases with a consequent reduction in the noise power. The mean phase error due to noise is inversely proportional to the carrier to noise ratio. When the noise amplitude is high the perturbations at the output of the phase detector derived from the carrier modulation are relatively small compared to the noise perturbations. However, when the noise power decreases as the AGC voltage increases, the phase perturbations of the carrier increase. The root mean square voltage applied to the ear phones 54 and 56 is inversely proportional to the square root of the carrier to noise ratio so that as the noise decreases during pointing of the antenna axis, a relatively rapid quieting occurs in the ear phone as the intercepted carrier increases in power.

Referring now to FIG. 7 which shows an antenna lobe pattern 290 which is the relatively narrow pattern or beam of the station's antenna during transmission and shows a lobe pattern 292 which is the relatively wide pattern of the antenna during reception of information from the transponder at the satellite, the operation of the system in accordance with the invention will be explained in further detail. The system tracks by utilizing the absolute knowledge contained in the return signal which indicates when the transmitted informational signal is illuminating the satellite antenna and is saturating the receiver thereof, for example. For broad pointing or acquisition of the satellite, the receive lobe 292 of the antenna is utilized with the system responding to either a communication signal received from other stations through the satellite or to the beacon signal being continually radiated therefrom.

In operation, the system of FIG. 1 is first generally oriented with the pointing direction of the antenna system 20 selected from a general knowledge of the compass direction of the satellite and the approximate elevation angle. The operator then selects either the beacon signal or the communication signal for broad pointing and may first listen to the ear phones 54 (when responding to the communication signal) for a signal with minimum noise amplitude which may be either a voice or code signal, for example. The operator then observes the broad pointing meter 48 or the broad pointing meter 46 to move the manual controls 28 and 30 until the reading or readings thereof are maximum. However, because of the width of the lobe 292 as developed by the antenna 20, the broad pointing direction is relatively inaccurate. This broad pointing or initial acquisition feature allows the station to be set up and operated with a minimum of ease and without complicated positional coordinates.

Once the antenna has been broadly pointed at the satellite, the operator then utilizes the ear phones 56 and the tracking meter 50. It is to be noted that the ear phones 56 may provide an initial position as the antenna is being pointed for the accurate tracking condition, but the meter 50 is normally utilized for the final pointing of the antenna 20. It is to be noted that during some high noise conditions, only the ear phones 56 may be utilized for tracking by discriminating between the noise and modulated signal resulting in a limited accuracy. Thus, by listening to the station's own return signal which is directly related to the degree of illumination of the satellite by the station's transmitted signal, accurate tracking is performed with the accuracy that would be provided if the narrow lobe pattern of the antenna during transmission were available during reception. Because the transmission to a satellite is characteristically at a relatively high microwave frequency, the antenna transmission pattern is relatively narrow compared to the receive lobe pattern at the relatively low microwave frequency. It is to be noted that because of the power saving resulting from the satellite transponder radiating energy at a relatively low frequency, this type of frequency conversion is conventionally utilized in satellite communication systems.

It has been found that approximately six changes of antenna pointing direction per hour are required for optimum pointing control with a synchronous satellite. The system in accordance with this invention has been found to maintain a more constant signal level through the satellite than is possible with a monopulse system in which an error signal must be developed to perform a pointing operation. The system in accordance with this invention over a period of an hour has been found to provide a signal level that varied less than 1 db (decibel) when tracking Syncom II while a conventional monopulse system with the continuous hunting required to operate, produces approximately 1½ to 2 db of signal level variation. Therefore, the system in accordance with this invention utilizes the knowledge that the return signal from the satellite transponder of its own transmitted communication signal has an amplitude that varies with the pointing direction with a high degree of accuracy.

Referring now to FIG. 8 as well as to FIG. 7, the pointing accuracy during accurate tracking is enhanced by both the narrow transmission beam 290 and by the power radiation characteristics of the satellite. A curve 300 of FIG. 8 shows the variation of transponder radiated power as a function of the signal level input power or signal power intercepted by the antenna of the satellite. The curve 300 which is characteristic of communication satellites, is a function of the satellite receiver sensitivity, the satellite antenna gain parameters and the noise figure of the satellite receiver. For an example of one arrangement in accordance with the invention, the transmit lobe 290 may be 0.65 degree wide at the 3 db point down in gain and the receive lobe 292 may have 26 degrees width at the 3 db point. At a point A of the curve 300 the satellite may be at a point 302 on the boresight axis 21 of the antenna dish 22 and the receiver in the satellite may be saturated. When the satellite is in a position 304 the radiated power of the transponder decreases to the point B of the curve 300 over a portion having a relatively steep slope. Also, the transmitted power of the beam 290 that impinges on the satellite at the position 304 is decreased to a relatively low gain value at the point B of the lobe 290. Thus, the combined effect of the error produced by the relatively narrow transmitting lobe and the effect of the satellite transmission characteristic curve 300 rapidly changing from a peak region to a sloped region provides a double rate amplitude change during accurate tracking. The system in accordance with the invention has the capability of concentrating the gain effects resulting from both the narrow transmitting beam and the satellite characteristics. Therefore, because the system is effectively tracking the satellite in response to its narrow transmit beam, highly accurate pointing and tracking is provided.

Thus there has been described a relatively simple but highly reliable satellite tracking and communication system that operates without the complexities of either a monopulse or conical scan type arrangement. The system operates with a satellite that receives signals in one frequency range and retransmits the signals in a second lower frequency range. For accurate tracking, the system resorts to the absolute knowledge contained in the returned signal after transmission from that system, that the station's relatively narrow transmitting antenna pattern is illuminating the satellite. For broad pointing or initial acquisition of the satellite the system, with minimum knowledge of the position of the satellite, provides interrogation of the relatively wide and broad antenna pattern developed by received communication energy or from beacon energy transmitted by the satellite. The system applies signals to meters representative of the signal power received by the antenna and audio signals to ear phones for listening to the noise amplitude associated with the received information which, for example, may be a voice. Thus, the system in accordance with the invention provides both for initial acquisition or broad pointing of the communication antenna and for accurate tracking with a minimum of complexity and with a high degree of reliability.

What is claimed is:

1. A system for tracking a communication satellite, said satellite receiving signals at a first frequency and transmitting the signals at a second lower frequency, said satellite transmitting signals with a power level being a function of the intercepted power of said first signal, comprising
   an antenna having an axis, said antenna having a relatively narrow beam pattern at the first frequency and a relatively wide beam pattern at the second frequency,
   a transmitter coupled to said antenna for transmitting a first signal to the satellite at said first frequency,
   a receiver coupled to said antenna for receiving a second signal at said second frequency transmitted by said satellite in response to said first signal, said second signal having an amplitude proportional to the first signal power intercepted by said satellite,
   and means coupled to said receiver to provide an indication of the power of said second signal intercepted by said antenna,
   whereby the system responds to the relatively wide beam pattern of the received second signal to provide an indication of the pointing direction of the axis of said antenna with substantially the accuracy of the arrow beam pattern of the transmitted first signal.

2. A satellite tracking system comprising
   antenna means having an axis,
   means coupled to said antenna means for transmitting a first signal to the satellite, said satellite responding to transmit a second signal having a substantially lower frequency than said first signal and having an energy level as a function of the angular pointing direction of the axis of said antenna means relative to said satellite,
   means coupled to said antenna means for receiving said second signal,
   and means coupled to the means for receiving to develop a signal having an amplitude representative of the energy level of said second signal and representative of the angular pointing direction of said antenna means relative to said satellite.

3. A system for tracking a satellite that intercepts energy at a first frequency and transmits energy at a lower second frequency comprising
   antenna means having a relatively narrow beam pattern at said first frequency and a relatively wide beam pattern at said second frequency,
   transmitting means coupled to said antenna means for transmitting energy at said first frequency with said relatively narrow beam pattern,
   receiving means coupled to said antenna means for receiving energy with said wide beam pattern after being transmitted by said satellite in response to interception of the energy transmitted by said transmitting means,
   and means coupled to said receiving means for developing a signal representative of the pointing direction of said antenna means as a function of said narrow transmitting beam.

4. A system for locating and tracking a satellite, said satellite responding to signals received thereby to transmit the signals after a predetermined down conversion in frequency, said satellite transmitting signals received from remote stations comprising
   antenna means,
   transmitting means coupled to said antenna means for transmitting a signal to said satellite,
   receiving means coupled to said antenna means for receiving signals transmitted from said satellite, said satellite responding to signals transmitted from said antenna means and responding to signals transmitted from remote stations,
   means coupled to said receiving means for developing a first signal having an amplitude representative of the power of the received signals originating from remote stations for broadly pointing said antenna means toward said satellite and for developing a second signal having an amplitude representative of the power of the received signals originating from said transmitting means for accurate pointing of said antenna means,
   and indicating means for displaying the amplitudes of said first and second signals.

5. A satellite tracking system comprising
   means for transmitting a first signal to the satellite, said satellite responding to said first signal to transmit a second signal with a power level as a function of the angular tracking error,
   means for receiving said second signal,
   and means for developing a signal representative of the received power of said second signal, said second signal having a substantially minimum amplitude when said angular tracking error is a minimum.

6. A system operable with a remote communication transmitting station for tracking a satellite having a transponder for transmitting received signals at a converted frequency lower than a received frequency comprising
   antenna means,
   transmitting means coupled to said antenna means for transmitting an informational signal to said satellite,
   receiving means coupled to said antenna means for receiving informational signals from said satellite responding to informational signals from the remote station and from said antenna, and means for developing a first signal representative of the amplitude of the received signal originating from said remote station for broadly pointing said antenna, and for developing a second signal representative of the amplitude of the received signal originating from said transmitting means for accurately pointing said antenna.

7. A satellite tracking system for broad pointing and accurate pointing of the system to a communication satellite in the presence of a remote communication station, said satellite responding to received signals to transmit signals with a fixed down conversion in frequency comprising a communication antenna having a boresight axis and movable so that said axis points at the satellite, a transmitter coupled to said antenna for transmitting first frequency modulated communication signals, means coupled to said antenna for receiving said first signals and second frequency modulated signals from said satellite responding to communication signals from the remote station, first and second filter means coupled to said means for receiving for respectively passing said first and second signals, first and second gain control amplifiers respectively coupled to said first and second filter means, first and second phase lock demodulator means respectively coupled to said first and second gain control amplifiers for responding to the signals passed therethrough and developing respective first and second automatic gain control voltages for controlling the gain of the respective amplifiers, and first and second indicating means respectively coupled to said first and second demodulator means for responding to said first and second automatic gain control voltages to respectively indicate values representative of the accurate pointing direction of the boresight axis of said antenna and the broad pointing direction of the boresight axis of said antenna.

8. A system for initial acquisition and tracking of a satellite in the presence of a remote communication station, the satellite responding to signals received in a first frequency range to transmit signals with a predetermined down conversion in frequency to a second frequency range, the remote stations transmitting signals in a first frequency range comprising antenna means movable to point at the satellite, transmitting means coupled to said antenna means for transmitting signals in said first frequency range, receiving means coupled to said antenna means for receiving first signals from said satellite after the down conversion and for receiving second signals from said satellite transmitted in response to signals received from a remote station, first and second demodulator means included in said receiving means for respectively developing third and fourth signals representative of the power received by said antenna means in response to the respective first and second signals.

and first and second indicating means respectively responsive to said third and fourth signals to indicate the broad pointing direction of said antenna means for acquisition of said satellite and the substantially accurate pointing direction of said antenna for tracking of said satellite.

9. A system for initial acquisition and tracking of a satellite having a transponder responsive to signals received from remote stations in a first frequency range to transmit signals in a second frequency range substantially less than said first frequency range, said satellite transmitting a beacon signal in said second frequency range comprising antenna means having a boresight axis, transmitting means coupled to said antenna means for transmitting a signal in the first frequency range, a receiver including first, second and third demodulator means for developing signals representing the power of the signals intercepted by said antenna means respectively from signals transmitted by the transponder in response to signal sfrom remote stations, from beacon signals transmitted by said satellite and from signals transmitted by said transponder in response to the signals transmitted by said transmitting means, and first, second and third indicating means responsive to the signals respectively developed by said first, second and third demodulator means, the signals developed by said first and second demodulator means having a magnitude indicative of the approximate position of said satellite relative to said boresight axis and the signals developed by said third demodulator means having an amplitude representative of the substantially accurate position of the satellite relative to said boresight axis.

10. A tracking system operable with a communication satellite and with a communication station transmitting a first signal to the satellite, the satellite responding to the first signal to transmit a second signal having a substantially lower frequency than the first signal comprising movable antenna means having an axis, means coupled to said antenna means for transmitting a third signal to the satellite, said satellite responding to transmit a fourth signal having a substantially lower frequency than said third signal and having an energy level as a function of the angular pointing direction of the axis of said antenna means relative to said satellite, means coupled to said antenna means for receiving said second signal with a substantially constant energy level over a first range of angular variation of the pointing direction of said axis and for receiving said fourth signal with a substantially constant energy level over a second range of angular variation of the pointing direction of said axis, said second range being substantially smaller than said first range, and means coupled to the means for receiving to develop first and second signals having amplitudes respectively representative of the energy levels of said second and fourth signals and representative of the pointing direction of said axis respectively within said first and second ranges of angular variation of the pointing direction of said axis relative to said satellite.

11. A system for initial acquisition and tracking of a communication satellite, said satellite receiving signals in a first frequency band and transmitting the signals in a second lower frequency band, said system operable with other tracking systems for transmitting a first signal to the satellite in the first frequency band, said satellite responding to the first signal to transmit a second signal in the second frequency band comprising an antenna having a pointing axis and having a relatively narrow gain pattern in the first frequency band and a relatively wide gain pattern in the second frequency band, a transmitter coupled to said antenna for transmitting a third signal to the satellite in the first frequency band, a receiver coupled to said antenna for receiving a fourth signal in the second frequency band transmitted by said satellite in response to said third signal and for receiving the second signal, and means coupled to said receiver to develop fifth and sixth signals having amplitude characteristics respectively representative of the power of said second and fourth signals intercepted by said antenna, said fifth signal having a substantially minimum amplitude when said pointing axis is directed toward said satellite over a wide range of angular variation from alignment therewith and said sixth signal having a substantially minimum amplitude when said pointing axis is directed toward said satellite over a narrow range of angular variation from alignment therewith, whereby the amplitude of said fifth signal provides initial acquisition information in response to the relatively wide gain pattern and the amplitude of said sixth signal provides tracking information in response to the wide gain pattern but with the accuracy of the narrow gain pattern.

12. A system for initial acquisition and tracking of a communication satellite, said satellite receiving signals in a first frequency band and transmitting the signals in a second lower frequency band, said system operable with other tracking systems for transmitting a first signal to the satellite in the first frequency band, said satellite responding to the first signal to transmit a second signal in the second frequency band, said satellite transmitting a beacon signal in said second frequency band, comprising an antenna having a pointing axis and having a relatively narrow gain pattern in the first frequency band and a relatively wide gain pattern in the second frequency band, a transmitter coupled to said antenna for transmitting a third signal to the satellite in the first frequency band, a receiver coupled to said antenna for receiving a fourth signal in the second frequency band transmitted by said satellite in response to said third signal and for receiving the second signal and the beacon signal, and means coupled to said receiver to develop fifth, sixth and seventh signals having amplitude characteristics respectively representative of the power of said second signal, said beacon signal and said fourth signal intercepted by said antenna, said fifth and sixth signals having a substantially minimum amplitude when said pointing axis is directed toward said satellite over a wide range of angular variation from alignment therewith and said seventh signal having a substantially minimum amplitude when said pointing axis is directed toward said satellite over a narrow range of angular variation from alignment therewith, whereby the amplitude of said fifth and sixth signals provides initial acquisition information in response to the relatively wide gain pattern and the amplitude of said seventh signal provides tracking information in response to the wide gain pattern but with the accuracy of the narrow gain pattern.

13. A system for initial acquisition and tracking of a communication satellite, said satellite receiving signals in a first frequency band and transmitting the signals in a second lower frequency band, said satellite transmitting a beacon signal in said second frequency band comprising an antenna having a pointing axis and having a relatively narrow gain pattern in the first frequency band and a relatively wide gain pattern in the second frequency band, a transmitter coupled to said antenna for transmitting a first signal to the satellite in the first frequency band, a receiver coupled to said antenna for receiving a second signal in the second frequency band transmitted by said satellite in response to said first signal and for receiving the beacon signal, and means coupled to said receiver to develop third and fourth signals having amplitude characteristics respectively representative of the power of said second signal and said beacon signal intercepted by said antenna, said third signal having a substantially minimum amplitude when said pointing axis is directed toward said satellite over a wide range of angular variation from alignment therewith and said fourth signal having a substantially minimum amplitude when said pointing axis is directed toward said satellite over a narrow range of angular variation from alignment therewith, whereby the amplitude of said third signal provides initial acquisition information in response to the relatively wide gain pattern and the amplitude of said fourth signal provides tracking information in response to the wide gain pattern but with the accuracy of the narrow gain pattern.

14. A satellite communication system in a first communication station operable with a second communication station transmitting first communication signals to the satellite, the system providing a signal representative of the broad pointing direction of a communication antenna for initial acquisition of the satellite and a signal representative of the substantially accurate pointing direction of the antenna for tracking of the satellite, said satellite responding to signals intercepted thereby to transmit the signals with a predetermined down conversion in frequency, the satellite responding to the first signals to transmit second communication signals, comprising a communication antenna having a boresight axis, said antenna being movable to control the pointing direction of said axis relative to the satellite, a transmitter for transmitting third communication signals to said satellite, said satellite responding to transmit fourth communication signals, receiving means coupled to said antenna for receiving the second signals and said fourth signals, first and second demodulator means including automatic gain control means and coupled to said receiving means for respectively responding to the second and fourth signals to develop fifth and sixth automatic gain control signals representative of the amplitude of said second and fourth signals and to develop seventh and eighth audio signals having noise levels representative of the amplitude of the respective second and fourth signals.

15. A system, operable with a remote communication station, for communication with a satellite by broad pointing of the system for initial acquisition of the satellite and accurate pointing of the system for tracking the satellite, said satellite responding to signals intercepted thereby to transmit the signals with a predetermined down conversion in frequency, the satellite responding to first communication signals transmitted by the remote station to transmit second communication signals, comprising a communication antenna having a boresight axis, said antenna being movable so that said axis points at the satellite, a transmitter for transmitting third communication signals to said satellite, said satellite responding to transmit fourth communication signals, receiving means coupled to said antenna for receiving the second signals and said fourth signals, first and second filter means coupled to said receiving means for respectively passing signals representative of said second and fourth signals, first and second gain control amplifiers respectively coupled to said first and second filter means, first and second demodulator means respectively coupled to said first and second amplifiers for responding to the signals passed through said filter means to develop fifth and sixth signals for controlling the gains of said amplifiers, said fifth and sixth signals having amplitudes respectively representing the power intercepted by said antenna of the second and fourth signals, and first and second indicating means respectively coupled to said first and second demodulator means to respond to said fifth and sixth signals for respectively providing an indication having a substantially maximum value when the boresight axis of said antenna is broadly pointing toward said satellite and providing an indication having a substantially maximum value when the boresight axis of said antenna is substantially accurately pointing to said satellite.

16. A satellite tracking and communication system for broad pointing of the system during initial acquisition of the satellite and for accurate pointing of the system during tracking of the satellite, said system operable with another communication station, said satellite responding to received signals to transmit signals with a fixed down conversion in frequency comprising a communication antenna having a boresight axis and movable so that said axis points at the satellite, a transmitter coupled to said antenna for transmitting first frequency modulated communication signals, said satellite responding to said first signals to transmit second frequency modulated signals, means coupled to said antenna for receiving said second signals and third frequency modulated signals transmitted from said satellite responding to frequency modulated communication signals received from the other communication station, first and second filter means coupled to said means for receiving for respectively passing said second and third signals, first and second gain control amplifiers respectively coupled to said first and second filter means, first and second phase lock demodulator means respectively coupled to said first and second gain control amplifiers for responding to the signals passed therethrough to develop respective first and second audio signals and to develop respective first and second automatic gain control voltages for controlling the gain of said amplifiers, first and second ear phones respectively coupled to said first and second demodulator means for responding to the respective first and second audio signals to develop sounds having substantially minimum noise volume respectively when said boresight axis is substantially accurately pointing toward said satellite for tracking thereof and when said boresight axis is broadly pointing toward said satellite for initial acquisition thereof, and first and second indicating means respectively coupled to said first and second demodulator means for respectively indicating the amplitudes of said first and second automatic gain control voltages having substantially maximum amplitudes respectively representative of when said boresight axis is substantially accurately pointing toward said satellite for tracking thereof and when said boresight axis is broadly pointing toward said satellite for initial acquisition thereof.

References Cited by the Examiner

UNITED STATES PATENTS 3,113,268  12/1963  Horak _____ 343—6.8 X

OTHER REFERENCES

"Doubling Tracking Accuracy With a Two-Way Doppler System," by Huie et al., Electronics, July 20, 1962, pp. 42–45.

CHESTER L. JUSTUS, *Primary Examiner.*

P. M. HINDERSTEIN, D. C. KAUFMAN,
*Assistant Examiners.*